US009402773B2

(12) United States Patent
Woodman et al.

(10) Patent No.: US 9,402,773 B2
(45) Date of Patent: Aug. 2, 2016

(54) PRONE CART

(71) Applicants: Lynda Woodman, Oakdale, MN (US); Gary J. Kroll, St. Paul, MN (US); Karen Cepress, Mahtomedi, MN (US); Amy Schulz, St. Paul, MN (US); Kath Roske, Eagan, MN (US); Paula Braaten, Blaine, MN (US); David Griffith, White Bear Lake, MN (US)

(72) Inventors: Lynda Woodman, Oakdale, MN (US); Gary J. Kroll, St. Paul, MN (US); Karen Cepress, Mahtomedi, MN (US); Amy Schulz, St. Paul, MN (US); Kath Roske, Eagan, MN (US); Paula Braaten, Blaine, MN (US); David Griffith, White Bear Lake, MN (US)

(73) Assignee: GILLETTE CHILDREN'S SPECIALTY HEALTHCARE, St. Paul, MN (US)

( * ) Notice: Subject to any disclaimer, the term of this patent is extended or adjusted under 35 U.S.C. 154(b) by 0 days.

(21) Appl. No.: 14/603,958

(22) Filed: Jan. 23, 2015

(65) Prior Publication Data

US 2015/0320624 A1 Nov. 12, 2015

Related U.S. Application Data

(60) Provisional application No. 61/991,915, filed on May 12, 2014.

(51) Int. Cl.

| | |
|---|---|
| ***B62B 5/00*** | (2006.01) |
| ***A61G 1/044*** | (2006.01) |
| ***A61G 1/04*** | (2006.01) |
| ***A61G 1/013*** | (2006.01) |
| ***A61G 1/02*** | (2006.01) |
| ***A61G 1/048*** | (2006.01) |
| *A61G 5/02* | (2006.01) |

(52) U.S. Cl.

CPC ................ *A61G 1/044* (2013.01); *A61G 1/013* (2013.01); *A61G 1/0212* (2013.01); *A61G 1/0237* (2013.01); *A61G 1/0287* (2013.01); *A61G 1/04* (2013.01); *A61G 1/048* (2013.01); *A61G 5/02* (2013.01); *A61G 2200/325* (2013.01)

(58) Field of Classification Search

CPC ......... A61G 1/0287; A61G 1/04; A61G 1/00; A61G 1/02; A61G 1/044; A61G 1/0237; A61G 7/08; A61G 1/1046; B62B 3/00; B62B 3/02; B62B 3/002; B62B 3/005; B62B 3/10; B62B 3/102; B62B 2202/42

See application file for complete search history.

(56) References Cited

U.S. PATENT DOCUMENTS 1,483,507 A * 2/1924 Brockbank ............. C04B 35/52 427/397.8
2,362,721 A * 11/1944 Reynolds ............... A61G 1/013 280/47.25

(Continued)

*Primary Examiner* — James M Dolak

(74) *Attorney, Agent, or Firm* — Barbara A. Wrigley; Fox Rothschild LLP

(57) ABSTRACT

A prone cart for transporting a patient in a hospital or clinic setting is provided. The prone cart includes a frame having a pair of extension slides coupled thereto and first and second sets of wheels. An upper portion includes first and second moveably adjustable trays operably coupled to said extension slides. The second tray includes a plurality of apertures in at least one side rail and the first tray includes at least one locking spring pin operably receivable by one of said plurality of apertures. The prone cart also includes a patient support surface.

17 Claims, 4 Drawing Sheets

(56) References Cited

U.S. PATENT DOCUMENTS

| | | | | | |
|---|---|---|---|---|---|
| 3,223,429 | A * | 12/1965 | Hastings | B62B 1/002 | 224/401 |
| 4,776,605 | A * | 10/1988 | Hathcock | A61G 1/0237 | 280/250.1 |
| 5,299,826 | A * | 4/1994 | Flowers | B62B 3/02 | 280/47.35 |
| 5,570,483 | A * | 11/1996 | Williamson | A61G 1/0293 | 177/144 |
| 5,570,988 | A * | 11/1996 | Gallaway | B62B 5/0003 | 414/343 |
| 5,634,221 | A * | 6/1997 | McKinney | A61G 1/0237 | 296/20 |
| 6,283,496 | B1 * | 9/2001 | Dickmann | B62B 1/208 | 280/40 |
| 6,766,547 | B1 * | 7/2004 | Lagassey | A61G 1/0567 | 5/507.1 |
| 7,032,921 | B2 * | 4/2006 | Swanner | B62B 1/125 | 280/645 |
| 7,374,181 | B1 * | 5/2008 | Wu | B25H 5/00 | 280/32.5 |
| 7,690,057 | B2 * | 4/2010 | Malassigne | A61G 1/0237 | 5/613 |
| 7,775,530 | B2 * | 8/2010 | Darling, III | A61G 1/013 | 280/47.18 |
| 8,117,696 | B2 * | 2/2012 | Wernqvist | A61G 7/002 | 5/610 |
| 8,209,802 | B2 * | 7/2012 | Linares | A61G 1/013 | 108/129 |
| 8,770,615 | B2 * | 7/2014 | Bar Noy | A61G 1/013 | 280/640 |
| 9,089,459 | B2 * | 7/2015 | Dindas | A61G 7/012 | |
| 9,187,110 | B2 * | 11/2015 | Bar Noy | B62B 3/02 | |
| 9,192,528 | B1 * | 11/2015 | Ling | A61G 1/013 | |
| 2004/0201204 | A1 * | 10/2004 | Haire | A61G 1/013 | 280/639 |
| 2013/0076005 | A1 * | 3/2013 | McDade | B62B 1/20 | 280/418.1 |

* cited by examiner

PRONE CART

CROSS REFERENCE TO RELATED APPLICATIONS

This application claims the benefit of priority to U.S. Provisional application Ser. No. 61/991,915, filed on May 12, 2014, the entirety of which is hereby incorporated by reference.

THE FIELD OF THE INVENTION

The present invention relates generally to devices that provide transport to patients in a hospital setting and more specifically to prone carts.

BACKGROUND OF THE INVENTION

Depending on the medical pathology involved some patients may need to remain non-weight bearing and prone for prolonged periods of time during a hospital stay. To this end, a prone cart may be utilized. Prone carts are used for mobility by individuals, typically with spinal cord injury or for example Rhizotomy patients, for whom seated mobility, such as a wheelchair, is contraindicated. A prone cart is a flat/horizontal earl typically with a fixed height, propelled by the user while lying in a prone position. Currently available prone carts are uncomfortable, subjecting the patient to chronic neck, shoulder and back pain, and make social interaction and performing activities of daily hospital living difficult. Additionally, existing prone carts lack user accessible adjustability, as well as a storage area.

Therefore, a new design of prone cart is needed to overcome the problems with existing prone carts and which are further designed for safety, comfort and convenience and which offers users independence with increased mobility.

BRIEF SUMMARY OF THE INVENTION

It is therefore an object of the invention to provide a prone cart which overcomes the problems associated with conventional prone carts.

In certain embodiments, the prone cart in accordance with the invention includes a patient surface that comprises a tray within a tray that is adjustable from 60 inches to 78 inches in 3 inch increments.

In another aspect of the invention, the patient surface has extra depth to accommodate custom padding and a variety of therapy pads.

In another aspect of the invention, the patient surface does not have any side obstructions that may interfere with patient transfers.

In another aspect of the invention the prone cart includes a protected opening for feet with a patient is laying in a prone position.

In another aspect of the invention the prone cart include a large storage tray that is easily accessible by the patient and that can be used for fill pads, pillows, safety belts or patient personal items.

In a further aspect of the invention a push handle is removably mounted in smooth corner blocks and can be moved to either end of the cart and secured in place.

In a further aspect of the invention a foot brake is positioned at the head end of the cart.

In a further aspect of the invention safety belts are included. The prone cart may include any number of safety belts, although four are depicted. One or more safety belts may clip onto an integral rail on a first tray portion and can be slid into the desired position. One set is configured to be inserted into one of a plurality of apertures on a second tray portion.

In yet a further aspect of the invention a set of large wheels with solid tires is provided. The wheels may include smooth enclosed hand rings for easy self-wheeling by the patient.

BRIEF DESCRIPTION OF THE DRAWINGS

For a bettor understanding of the invention, and to show how the same may be carried into effect, reference will now be made, by way of example, to the accompanying drawings, in which.

DETAILED DESCRIPTION OF THE INVENTION

Unless defined otherwise, all terms used herein have the same meaning as is commonly understood by one of skill in the art to which this invention pertains.

Figure 1:
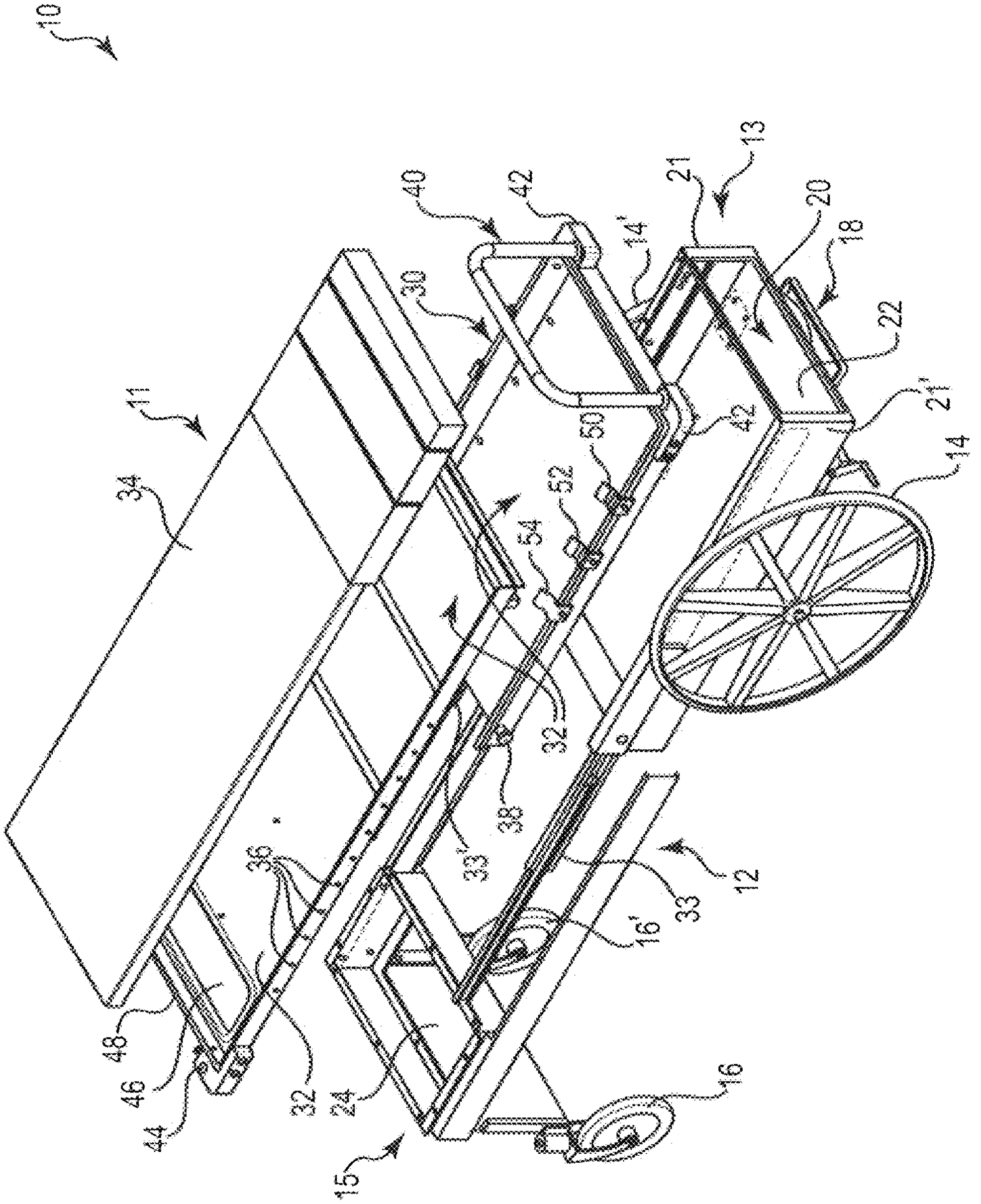
FIG. 1 is an exploded view of the prone cart in accordance with the invention.
Figure 2:
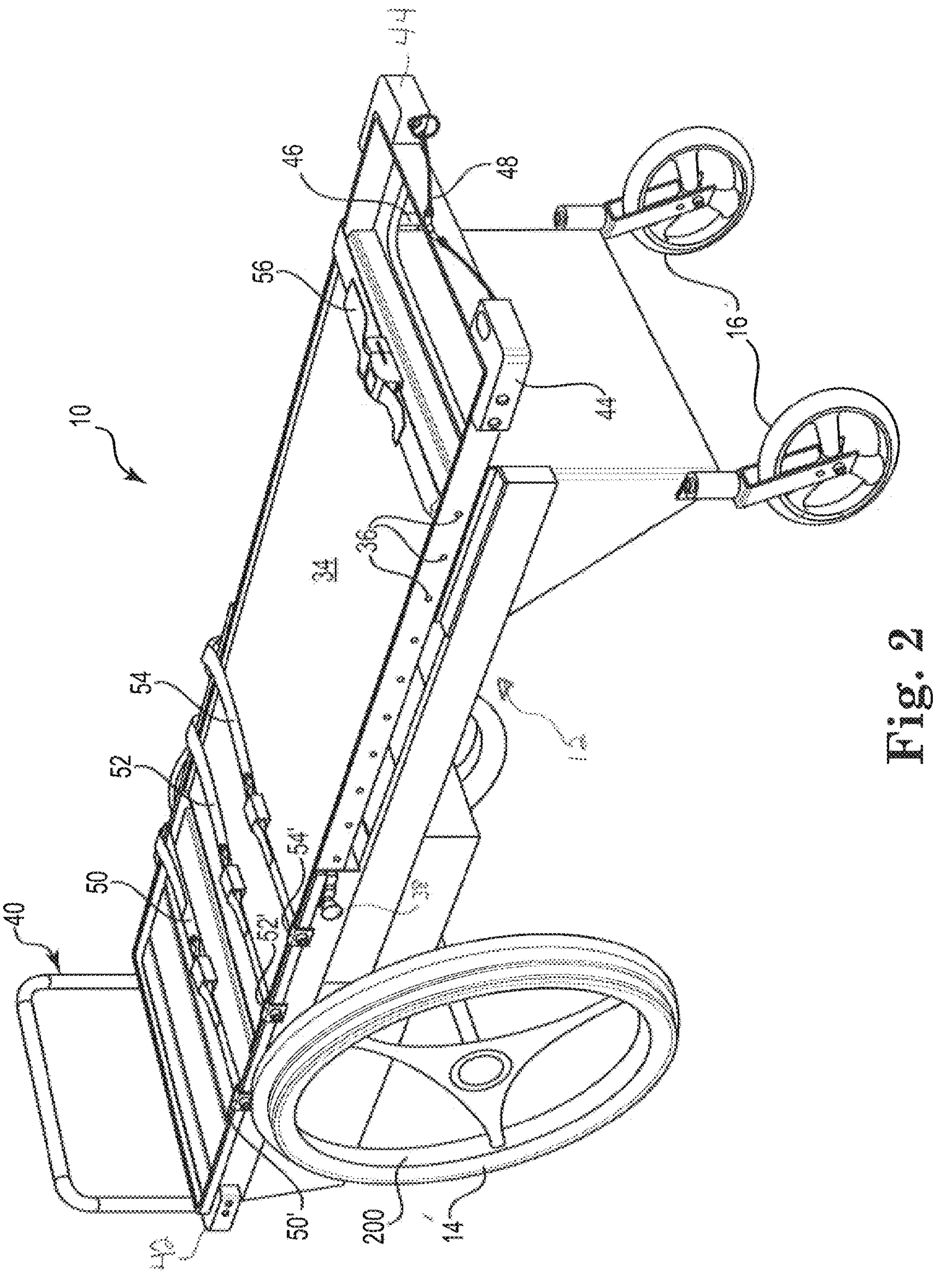
FIG. 2 is a perspective view of a prone cart in the expanded position accordance with the invention.
Figure 3:
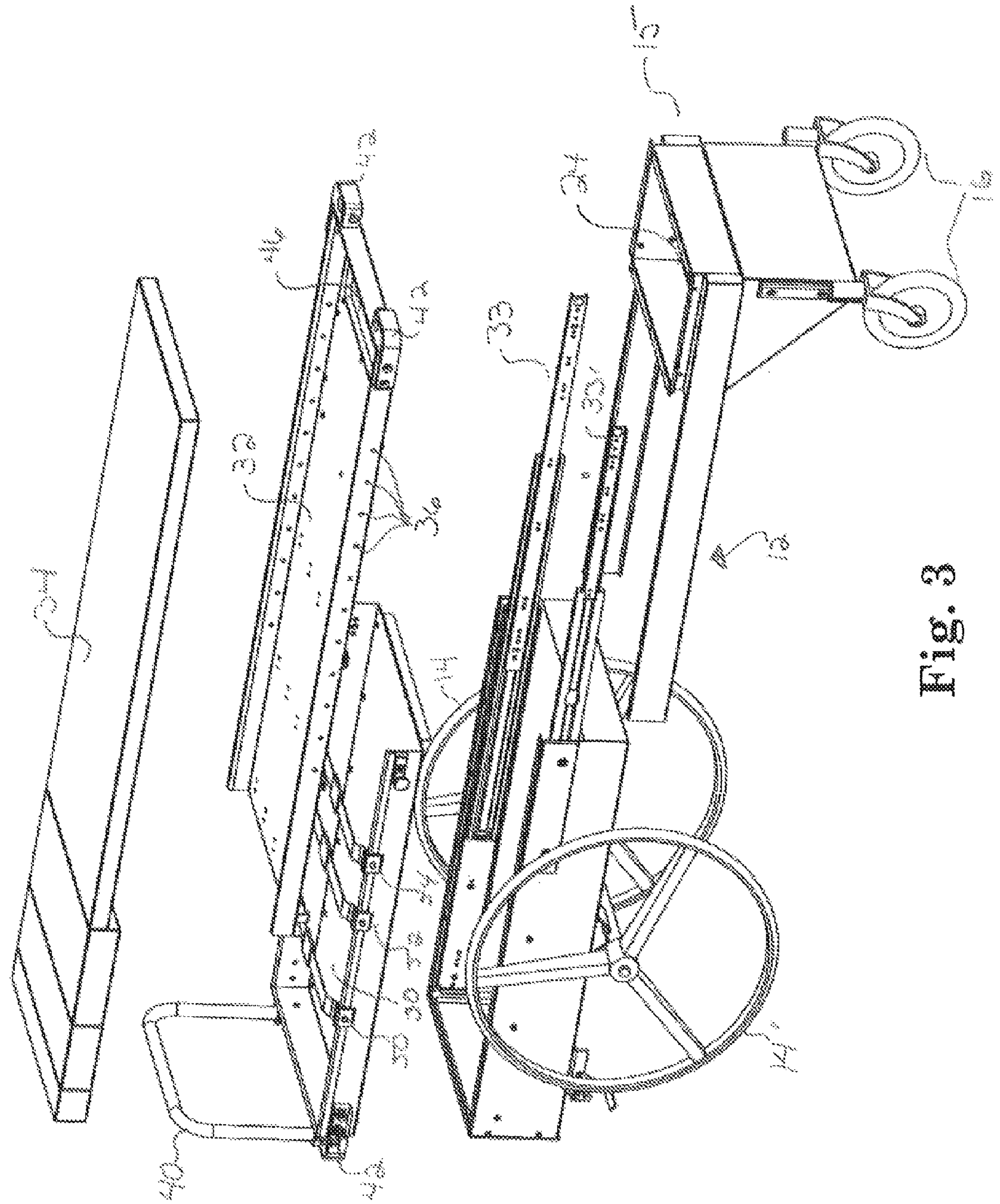
FIG. 3 is an exploded view of a prone cart in the expanded position in accordance with the invention.
Figure 4:
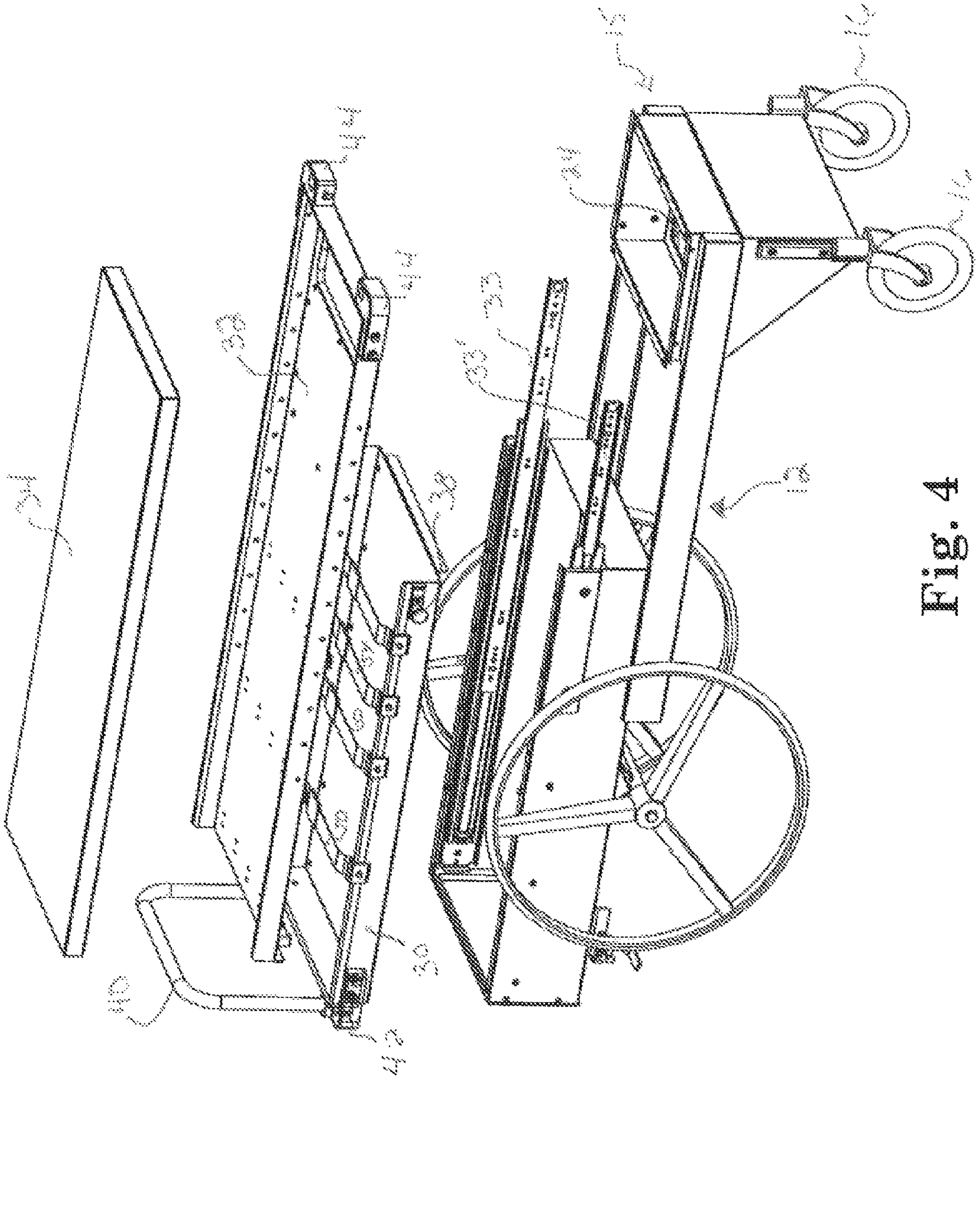
FIG. 4 is an exploded view of a prone cart in the contracted position.

Referring now to FIGS. 1 and 2 an exemplary embodiment of the prone cart 10 in accordance with the invention is shown. Prone cart 10 broadly includes a lower portion and an upper portion. Lower portion comprises frame 12 having two standard sized wheel chair wheels 14, 14' positioned at a front end 13 of the prone cart and two small wheels 16, 16' positioned at the rear end 15 of the prone cart. Wheels 14, 14' include smooth enclosed hand rings 200, best seen in FIG. 2, for easy self-wheeling by the patient. Brake 18 is operably coupled to frame 12 at the front end of the prone cart and functions to engage large wheels 14 to slow or stop movement thereof by means known to those of skill in the art. Brake 18 can also be used to lock large wheels 14 in place to stop movement of the cart completely. Those of skill in the art will appreciate that brake 18 is conveniently placed at the front end of the prone cart and is operable by hand if the patient desires to stop or slow the cart or by foot if an operator wheeling the cart desires to stop of slow the cart.

Storage tray 20 is slidably received by frame 12. Storage tray 20 is conveniently provided to allow a patient to store personal items or for fill pads, pillow, safety belts and the like. Those of skill in the art will appreciate that storage tray 20 is positioned at the front end 13 of the cart to allow the patient easy access to it. Handles (not shown) or other mechanisms may be operably coupled to the front end of the storage tray 20 to allow a user to easily slide the storage tray open. Storage tray 20 may be equipped with door 22 that is hingedly or magnetically coupled to the storage tray 20 sides 21, 21' to allow the patient to flip the door open. Those of skill in the art will appreciate that door may be constructed from non-breakable glass or clear Plexiglas to allow a patient to view the contents. Alternatively door 22 may be constructed of a solid material to ensure that its contents remain private. Still alternatively, door 22 may be eliminated so that the patient or hospital personnel can simply slide or deposit contents into the storage tray 20 more easily.

Back end 15 of frame 12 includes a preferably large-sized well 24. When a patient is in a prone position, well 24 accommodates the patient's feet whether the feet are encased in a case on whether the patient is wearing an ankle foot orthoses.

Thus, well 24 allows the patient to maintain the prone position without putting pressure on the feet and/or toes.

Upper portion 11 of prone cart 10 comprises first and second moveably adjustable trays 30, 32 which are operably received by frame 12 and patient surface 34 which is operably received over first and second trays 30, 32. First and second trays 30, 32 are supported by first and second extension slides, respectively 33, 33'. First and second trays 30, 32 are capable of a total of eighteen inches of linear adjustment in approximately three inch increments. Second tray 32 includes a plurality of apertures 36, that operably received pull and twist locking spring pin 38 positioned on a side of first tray 30. Those of skill in the art will appreciate that the total linear adjustment as well at the number and amount of increments may vary depending on the size of the prone cart.

First tray 30 is depicted as including push handle 40. Push handle 40 may have a fixed height or an adjustable height. Push handle 40 is removably mountable in set of corner blocks 42 on an end of the first tray 30. A second set of corner blocks 44 are located on an end of the second tray. Push handle 40 may be removed from the corner blocks on the first tray and repositioned in the corner blocks on the second tray to allow easy transfer to either end of the prone cart. Advantageously, corner blocks 42, 44 may have a rounded and smooth construction to prevent damage to walls or other objects the prone cart 10 may come into contact.

Second tray 32 includes a foot opening 46 at an end thereof formed in the surface of second tray 32 to allow a patient's feet to comfortably extend into the opening. Foot opening 46 is surrounded by a protected portion 48 formed by the second tray 32 which advantageously protects the patient's feet if the cart bumps into any objects during transit.

First and second trays 30, 32 have a depth of from 2,875 inches to 1,875 inches in order to accommodate not only the custom padding that comprises the patient surface 34 but also may accommodate a variety of therapy pads. When therapy pads are used, they replace an equally sized segment of the custom padded patient surface, which are made in a variety of sizes to accommodate the carts full-range of adjustability of overall length. The therapy pads and patient surface sections are interchangeable offering a variety of positioning options. Therapy pads are generally wedge-shaped as opposed to the patient surface pads which are flat.

Patient surface may be constructed with custom padding. The custom padding may be encased in a water-proof material such vinyl or Gortex and the like. Advantageously, the patient surface is shown as not having any side obstructions that may interfere with patient transfer. Those of skill in the art will appreciate, however, that side handles or other side elements may be included.

The upper portion 11 of prone cart 10 may include safety belts which may vary in number. As shown, the prone cart 10 in accordance with the invention includes four safety belts 50, 52, 54, 56 as best seen in FIG. 2. Three safety belts 50, 52, 54 are operably coupled, fixedly or moveably, to tabs 50', 52', 54' on first tray 30. The fourth safety belt 56 is removably coupled to one of plurality of openings 36 in second tray 32. As the second and first trays are adjustably changed so too can fourth safety belt 56 be adjusted.

Although the present invention has been described with reference to certain aspects and embodiments, those of ordinary skill in the art will appreciate that changes may be made in form or detail or both without departing from the spirit and scope of the invention.

What is claimed is:

1. A prone cart adapted to support individuals of varying height in at least a prone position comprising:

a lower portion comprising a frame having a pair of extension slides coupled to opposing sidewalls bounding said frame and first and second sets of wheels operably coupled to said frame;

an upper portion including a first tray coupled to a second tray, said second tray moveably adjustable with respect to said first tray along a longitudinal axis thereof, said second tray moveably supported by said extension slides, said second tray structured to expand from a first contracted position to a second expanded position, said second position providing a prone cart length greater than the prone cart length of said first position; and wherein said second tray includes a plurality of apertures in at least one side rail and further wherein said first tray includes at least one locking spring pin operably receivable by one of said plurality of apertures.

2. The prone cart of claim 1 wherein said upper portion further includes a patient support surface.

3. The prone cart of claim 1 wherein said frame includes a storage tray slidably coupled thereto.

4. The prone cart of claim 1 wherein said second tray includes a patient foot opening in an end thereof.

5. The prone cart of claim 1 wherein at least one of said first and second trays include first and second mountable corner blocks.

6. The prone cart of claim 5 further comprising a push handle removably mounted on said first and second mountable corner blocks in at least one of said first and second trays.

7. The prone cart of claim 3 wherein said storage tray includes an access door hingedly or magnetically coupled thereto.

8. The prone cart of claim 1 further comprising a brake coupled to said frame and operable to engage at least one of said first or second set of wheels.

9. The prone cart of claim 8 wherein said brake is operable by hand or by foot.

10. The prone cart of claim 1 wherein said first and second trays are linearly adjustable by at least eighteen inches.

11. The prone cart of claim 1 wherein said plurality of apertures are in a spaced-apart relationship.

12. The prone cart of claim 11 wherein said spaced-apart relationship is three inches.

13. The prone cart of claim 1 further comprising a plurality of safety belts operably coupled to said upper portion.

14. The prone cart of claim 13 wherein at least one of said safety belts is moveably coupled to said upper portion.

15. The prone cart of claim 2 wherein said patient support surface does not include side obstructions.

16. The prone cart of claim 2 wherein said patient support surface comprises segmented portions.

17. The prone cart of claim 6 wherein said push handle has a fixed height or a moveably adjustable height.

* * * * *